United States Patent [19]

Braga

[11] 4,270,241
[45] Jun. 2, 1981

[54] PROCESS FOR SLAUGHTERING OF ANIMALS BY BLEEDING

[75] Inventor: Alphonse M. Braga, Fullerton, Calif.

[73] Assignee: Radian Corporation, Austin, Tex.

[21] Appl. No.: 845,342

[22] Filed: Oct. 25, 1977

[51] Int. Cl.³ .......................... A22B 3/00; A22B 5/04
[52] U.S. Cl. .................................................. 17/1 C
[58] Field of Search ............................ 17/1 R, 45, 52

[56] References Cited

U.S. PATENT DOCUMENTS

| | | | |
|---|---|---|---|
| 1,452,863 | 4/1923 | Atwood | 17/1 C |
| 1,472,380 | 10/1923 | Atwood | 17/1 C |
| 1,504,013 | 8/1924 | Atwood | 17/1 C |
| 1,513,953 | 11/1924 | Atwood | 17/1 C |
| 1,675,856 | 7/1928 | Kreft | 17/1 C |
| 2,422,194 | 6/1947 | Harrington | 17/1 R |
| 3,149,370 | 9/1964 | Sauvage et al. | 17/45 |
| 3,857,137 | 12/1974 | Baud | 17/1 C |
| 3,947,919 | 4/1976 | Ekdahl | 17/1 C |

FOREIGN PATENT DOCUMENTS 247066  11/1969  U.S.S.R. ........................................ 17/1

Primary Examiner—J. M. Meister
Attorney, Agent, or Firm—Browning, Bushman & Zamecki

[57] ABSTRACT

A method for the slaughtering of animals by bleeding in which the animal is first stunned, the method comprising making an incision in said animal to expose the anterior wall of the thorax of the animal, inserting a cannulating device through said incision into the mediastinal space, the cannulating device being passed caudally so as to substantially, selectively enter a major mediastinal blood vessel of the animal and collecting blood flowing from the blood vessel through said cannulating device.

11 Claims, 5 Drawing Figures

PROCESS FOR SLAUGHTERING OF ANIMALS BY BLEEDING

BACKGROUND OF THE INVENTION

The present invention relates to the slaughtering of animals. More particularly, the present invention relates to a method for the killing of slaughterhouse animals by bleeding whereby the blood may be collected in a substantially sterile state.

The current slaughterhouse killing of animals involves exsanguination preceded by stunning. In the method, the animal, e.g. steer, heifer, or other such animal, is driven through a chute into a stunning stall. The animal is stunned by one of several techniques, all designed to render the animal unconscious but still alive without any penetration of the animal's body. Following removal from the stall, the animal is suspended by its hindlimbs and an incision is made generally in the midline from the manubrium to the ventral base of the neck to expose the anterior wall of the thorax. Entrance is then made into the thorax by cutting through the hypaxial muscles which form the anterior chest wall. This incision is then followed by the passage of the knife through a "window" formed laterally by the first pair of sternal ribs, ventrally by the manubrium and dorsally by the thoracic vertebrae and hypaxial musculature. The large vessels in the anterior mediastinal space are incised en masse by this last incision. In this bleeding procedure, blood from the animal pools in the anterior chest, flows out the incision, down the animal's neck and collects on the floor of the slaughterhouse.

The above described bleeding procedure suffers from several major disadvantages. For one, the large amounts of blood produce a waste stream from the slaughterhouse with extremely high levels of biochemical oxygen demand (BOD). For example, the average beef-slaughtering plant produces 12 to 16 pounds of BOD per head per day. It is estimated that at least 25% of the BOD attributable to the slaughtering and packing of beef is accounted for by the blood loss described above. Environmental laws, both national and local, generally require that animal processing wastes from slaughterhouses undergo treatment prior to discharge into surface streams, i.e. the BOD load must be reduced to suitable levels. It will be readily recognized that in a large slaughterhouse, such prior treatment is expensive and time consuming. Indeed a plant processing 1000 head/day would require about 10 MGD of dilution water to reduce the BOD of the waste-water to an acceptable level. Over and above the environmental problems caused by blood losses in the slaughterhouse, the conventional bleeding procedures represent the loss of a potentially valuable by-product, i.e. edible blood protein. The dry weight mass of blood is comprised of about 95% protein. In a world where protein adequate diets are becoming a rarity, especially in developing countries, and where providing meat to satisfy such diets is not economically feasible, it is imperative that alternate sources of high quality protein be found. Edible blood protein derived from slaughterhouse blood potentially provides an excellent and inexpensive food additive of wide applicability and is an attractive alternate to costly, high protein foods. While there are current procedures for collecting blood from slaughterhouses for use in the production of products for food purposes, such methods are time consuming and not amenable to high production rates. Additionally, extracted blood is an excellent growth medium for bacteria, molds, fungi, and viruses. The most generally used methods of blood collection permit the blood to be exposed to the atmosphere for considerable lengths of time thereby incurring the possibility that the blood will be contaminated and rendered unfit as a food additive. Additionally, currently used methods still permit the possibility of blood fouling of slaughterhouse floors. Also, most collection methods currently used are so time-consuming as to preclude wide-spread use in large slaughterhouses.

SUMMARY OF THE INVENTION

It is therefore an object of the present invention to provide an improved process for the killing of slaughterhouse animals by bleeding.

Another object of the present invention is to provide a process for the extraction of blood from slaughterhouse animals.

Still another object of the present invention is to provide a process for the substantially sterile collection of blood from slaughterhouse animals.

An important object of the present invention is to provide an improved process for the killing of animals by bleeding wherein pollution problems associated with blood losses are minimized.

The above and other objects of the present invention will become apparent from the drawings, the description given herein and the appended claims.

The improved process of the present invention involves a unique bleeding procedure by which animals, such as bovine and other slaughterhouse animals, are killed after they have been stunned. In the process, the stunned animal is preferably suspended by its hindlegs or in some other suitable manner such that the animal is suspended in the head down position. An incision is then made generally in the midline of the ventrum of the neck sufficient to expose the anterior wall of the thorax. A tubular member or cannula is then inserted in the midline of the anterior wall of the thorax and passed caudally at an angle which would have the cannula approximately, eventually exit the rectum were the cannula of sufficient length. The cannulating device is inserted through the incision such that the inserted or distal emd thereof, upon passing into the mediastinal space is substantially, selectively plunged into a major mediastinal blood vessel of the animal. The cannula is connected by a hose or the like to a collecting receiver such that the blood flowing through the cannula from the blood vessel passes directly from the animal to a sterile receiver resulting in sterile collection of the blood and minimal spillage on the slaugherhouse floor.

DESCRIPTION OF THE PREFERRED EMBODIMENTS

While the present invention will be described with particular reference to the cannulation of bovine animals it is to be understood that the procedure has application to any of various slaughterhouse animals such as porcine and ovine species in which the slaughtering is accomplished by stunning followed by bleeding.

Figure 1:
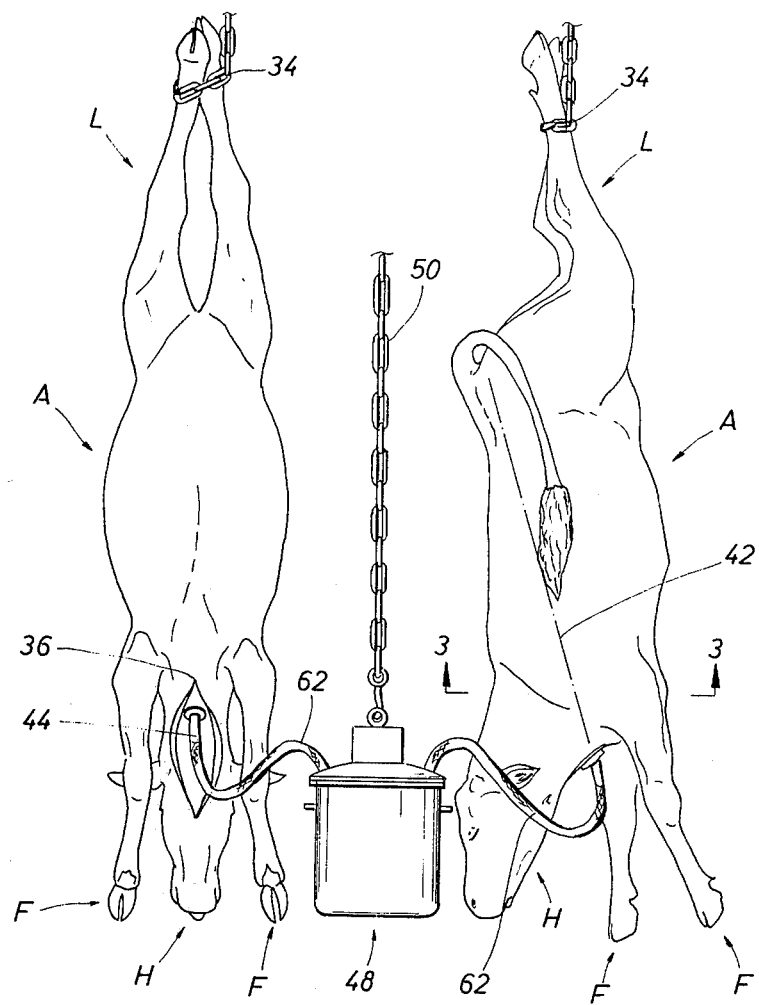
FIG. 1 is a view showing bleeding of stunned bovine animals by the process of the present invention.
Figure 3:
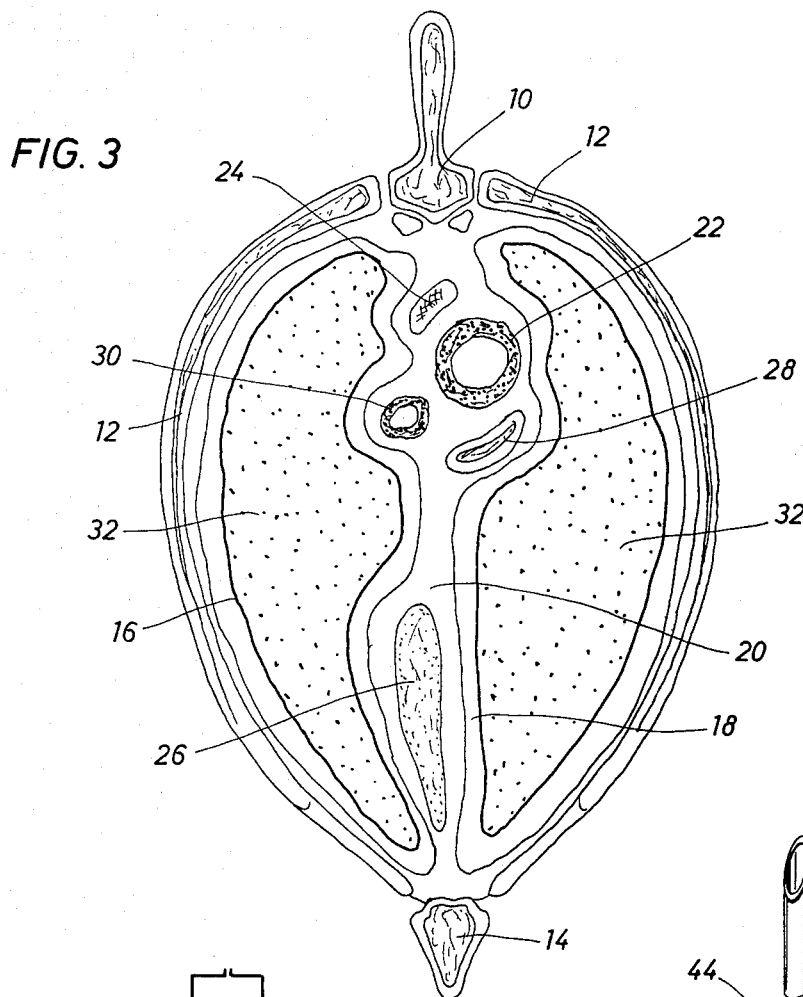
FIG. 3 is a cross-sectional view of the bovine thorax at the second intercostal space, generally along the lines 3—3 of FIG. 1.

Turning first to FIG. 3, which shows the cross-section of a bovine thorax at approximately the second intercostal space, i.e. a section taken generally along the lines 3—3 of FIG. 1, it can be seen that the bovine thorax is basically similar to that of other vertebrates in that it is essentially a bony cage in which are contained certain organs and structures of the bovine. The bony cage of the animal A is comprised of the thoracic vertebrae 10 (only one of which is shown) to which are adjoined the ribs 12. The floor of the bony cage is defined by the sternum 14 to which the other ends of the ribs 12 are adjoined. The chest cavity of the bovine is lined with a smooth serous membrane called the parietal pleura 16, the pleura forming a double layer near the midline of the thorax. The pleural sac 18 thus formed is known as the mediastinal pleura or mediastinum. Located within the mediastinal space 20, among other organs and structures, are the trachea 22, the esophagus 24, the thymus 26 and most of the great vessels in the animal, particularly the cranial vena cava 28 and the brachiocephalic trunk (artery) 30. The lungs 32 are located lateral to the mediastinal space 20.

Figure 2:
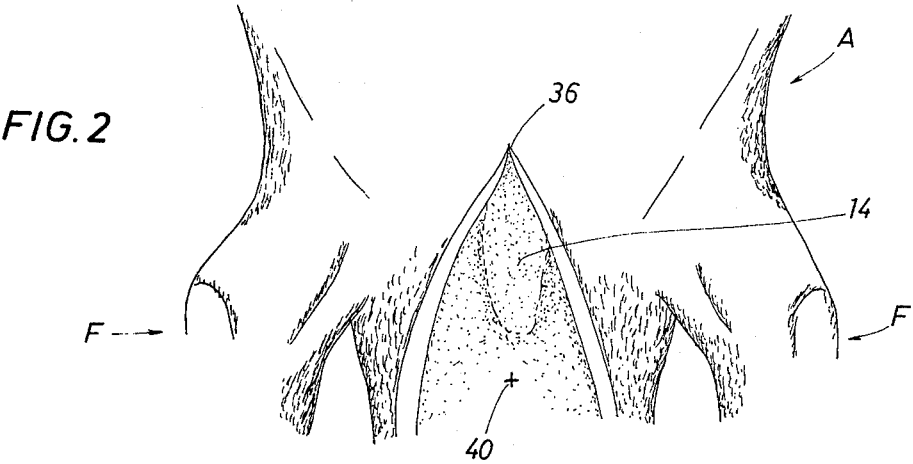
FIG. 2 is an enlarged, elevational view showing the initial incision made in the stunned animal prior to insertion of the cannulating device.

Reference is now made to FIGS. 1 and 2 for a detailed description of the exsanguination procedure of the present invention. It will be understood that the animal to be killed has been stunned in the conventional manner, i.e. the animal is substantially unconscious but is alive and there has been no penetration of the animal's body by virtue of the stunning. The animals A are seen as suspended by the hindlegs or limbs L by suitable shackles 34 which are attached to a conventional overhead support or conveyor (not shown). As thus suspended, the animals A hang in the head downward position, i.e. with the head H nearest the floor of the slaughterhouse. Using a suitable knife, an incision is made generally in the midline of the ventrum of the neck starting at the manubrium indicated generally at point 36, the incision being of sufficient length to expose a portion of the anterior wall of the thorax. It will be appreciated that at this point there has been no incision or cutting of the animal sufficient to result in death by bleeding. Rather the incision has been such as to merely permit parting of the hide from the neck area of the bovine. At this point, the cannulating device or cannula (described more fully hereafter) shown generally as 44 is inserted in the midline of the incision, i.e. generally equidistant between the forelimbs or legs F of the animal A. The point of insertion (shown at 40 in FIG. 2) of the cannulating device 44 lies dorsal to the manubrium, and is on an imaginery line between the axilla, i.e. the forelimbs F of the animal A. The cannulating device is passed caudally at an angle such that it would eventually exit the rectum if it were of sufficient length. The extrapolated line of insertion is shown on the right half of FIG. 1 and is represented by the dotted line 42. This placement of the cannulating device 44 results in the substantially, selective insertion of the distal end of the cannulating device 44 into one of the major mediastinal blood vessels, e.g. the cranial vena cava, of the animal A. In practice, the distal end of the cannulating device passes between the sternocephalicae, the first pair of ribs, through the parietal pleura and into the mediastinal space. Preferably, the distal end of the cannulating device 44 enters the cranial vena cava upon entry into the mediastinium. In practice, the cannulating device 44 is inserted to a pre-set depth depending upon the size and type of animal, a procedure which places the distal end of the cannulating device slightly cranial the right atrium of the heart. The contractions of the right atrium serve to pump venous blood out of the animal's body through the cannulating device 44 and hence into a suitable receiving container. As best shown in FIG. 1 the cannulating device has its proximate end, i.e. the end not inserted into the animal A, attached to a section of flexible tubing 62 or the like which in turn is connected to a suitable blood collecting receiver shown generally as 48. Receiver 48 is conveniently suspended by a chain 50 to a suitable support or conveyor (not shown) but which in practice would be moved along with the animals A as the latter move along the bleed line. The cannulating or exsanguination procedure described above results in the animal going into hypovolemic and shortly, irreversible shock. Death of the animal follows cannulation in about 2-5 minutes.

Figure 5:
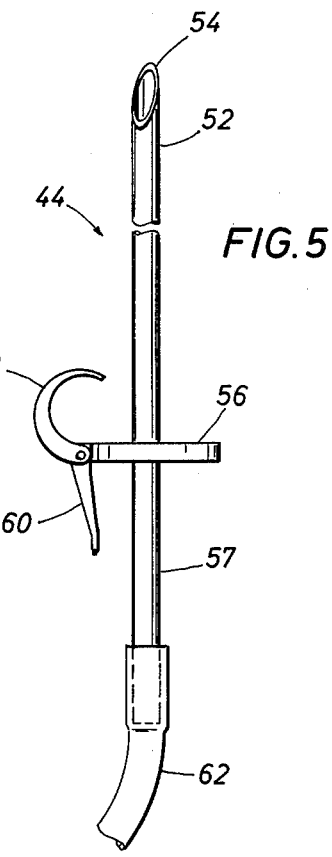
FIG. 5 is an elevational view of one form of a cannulating device for use in the process of the present invention.

A suitable cannulating device 44 for use in the process of the present invention is shown in FIG. 5. The cannulating device 44 consists of an elongate tubular section 52 shaped much like a large hypodermic needle. It will be appreciated that the precise length and diameter of the tubular section 52 will depend upon the type and size of the animal which is being slaughtered. The insertion end 54 of the elongate tubular section 52 is pointed so as to permit ease of insertion into the animal and ultimately into one of the great blood vessels. The cannulating device 44 is provided with a stop member 56 which limits insertion of the tubular section 52 into the animal. A retractable hook 58 which can be opened by means of a spring biased handle 60 is employed to secure the cannulating device 44 in the animal's flesh while the bleeding occurs. The tubular section 52 extends through stop 56 and terminates in a tubular section 57 which is attached to a piece of flexible tubing 62, the other end of tubing 62 (not shown) being connected to blood collecting receiver 48. As previously noted, the length and diameter of the tubular section 52 of the cannulating device 44 will depend upon the size and type of the animal being slaughtered. It will be readily apparent that by making stop 56 adjustable, the depth of insertion of the cannulating device can be easily controlled so as to optimize the extent of insertion of the distal end 54 into the desired blood vessel.

Figure 4:
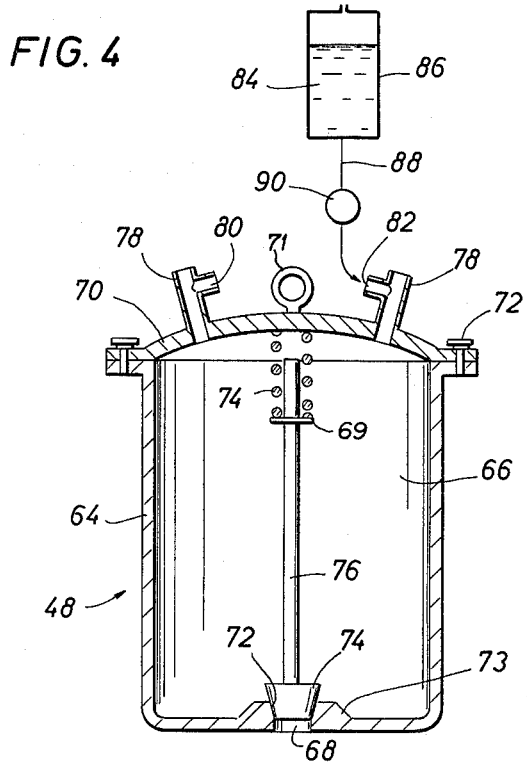
FIG. 4 is an elevational view, partly in section, showing a blood collecting receiver for use in the process of the present invention.

Turning now to FIG. 4, there is shown a suitable form of the blood collecting receiver 48. Receiver 48 comprises a housing 64 having a removable cover 70 forming a chamber 66. Housing 64 is provided with an opening 68 located at the bottom thereof, opening 68 being formed in an internally upset portion 73 of the bottom wall of housing 64, upset portion 73 defining a valve seat 72. A plug valve element 74 which seats in valve seat 72 serves to selectively open and close opening 68. Valve element 74 is attached to a control rod 76 which extends generally centrally up through chamber 66 and is affixed to a flange 68. As seen, cover 70 is secured to housing 64 in a suitable manner such as by thumbscrews 72 to thereby ensure that chamber 66 can be kept tightly closed. A spring 75 is disposed between flange 68 and the interior wall of cover 70. It will be apparent that when cover 70 is secured to housing 64, spring 75 will urge flange 68 and rod 76 away from cover 70. Hence, plug valve element 74 will be urged into engagement with valve seat 72 thereby ensuring that opening 68 will be closed. On the other hand, removal of cover 70 from receiver 48 will permit valve element 74 to unseat thereby permitting the contents in receiver 48 to flow through opening 68.

As shown, the cover 70 is provided with inlet tubes 78 which are attached to the ends of tubing 62, the other end of tubing 62, of course, being attached to the cannulating device 44. Inlets 78 are provided with laterally extending tubular portions 80 which form anti-coagulant aspirator orifices 82. A suitable anti-coagulant 84 in a container 86 is fed to anti-coagulant aspirator orifice 82 via a suitable tubular connection 88 and a metering valve 90. It will be apparent that as blood flows through inlet 78 into chamber 66, it will tend to aspirate anti-coagulant through orifice 82, metering valve 90 serving to control the ultimate amount of anti-coagulant which can be introduced. Thus, as the blood enters chamber 66, it is intimately admixed with the anti-coagulant and is therefore maintained in a fluid state until it can be further treated as such by spray-drying or other means to recover the edible blood protein. To facilitate handling of container 48 during the bleeding process, cover 70 is provided with a lift eye 71 which, as shown in FIG. 1, can be attached to chain 50 and suspended from a support, either fixed or moving down the bleed line of the slaughterhouse.

The process of the present invention is based on the surprising finding that if the exsanguination of the slaughterhouse animal is carried out as described above, the heart of the animal will serve as an in situ pump to actually pump blood from the expiring animal. This leads to several important results. For one, the amount of blood which is recovered from the animal is increased over that recovered in the conventional bleeding techniques. It is known that in animals slaughtered by conventional bleeding techniques, blood tends to collect and coagulate in the thoracic cavity with the result that the meat closely adjacent thereto (so called "hot meats") cannot be used for human consumption. It will be appreciated that in a large animal this can result in a loss of otherwise edible meat from the animal. In the en masse cutting of the great vessels in the conventional manner used in slaughtering techniques, it has been found that the animal's heart does not act to pump the blood from the animal to the same extent as when the cannulating procedure of the present invention is employed.

To test the effectiveness of the process of the present invention, several cows were slaughtered and post mortem dissections carried out. The first animal tested weighed 840 pounds. Following stunning, reflex movement of the pectoral girdle and forelimbs was observed even after shackling and suspension. An incision was made mid-ventrally at the base of the neck. Major arteries and veins at the apex of the heart were sliced with a quick movement of the operator's knife in the conventional slaughterhouse technique. Blood fell to the floor of the slaughterhouse for approximately one minute. Palpitation of the heart through the incision revealed that of rhythmic contractions of the heart continued for approximately three minutes after the blood flow ceased.

A second animal weighing 1,070 pounds was stunned, shackled and suspended, the animal retaining reflex movement of the forelimbs during the procedure. An incision, according to the invention and sufficient to permit reflection of the hide away from the cut, was made, again generally mid-ventrally at the base of the neck. Through this incision was inserted a cannula, such as that described above, to a depth of about 26 centimeters. Sausage casing was used as a transfer hose from the cannula to the collector. Blood flow was instantaneous and continued for approximately two minutes. It was observed that the cannula and collecting hose moved with the rhythmic heart beat and that the blood was visibly pumped from the body by the heart. The heart ceased to beat in about 2½ minutes. Upon removal of the cannula there was no spillage of blood on the floor of the slaughterhouse.

A third animal weighing 870 pounds was stunned and shackled, reflex movement of the forelimbs being observed after the shackling. Following a suitable incision to allow exposure of the anterior wall of the thorax, the cannulating device was inserted to a pre-set depth of 27 centimeters. Surgical tubing was used as the transfer tubing leading from the cannulating device to the blood collecting vessel. Upon insertion of the cannula, blood flow was again instantaneous and was pumped from the animal by the animal's heart. Flow of blood was essentially complete in 3–3½ minutes with 85%–90% of the blood being collected in the first 1½–2 minutes. No appreciable blood loss on the floor of the slaughterhouse occured. Subsequent dissection of the animal revealed that the interior of the thoracic cavity was free of clots or detritus. Approximately 35 pounds of blood were recovered in less than 3 minutes.

A fourth animal weighing approximately 840 pounds, following stunning and shackling, was cannulated and dissected exactly as that described in the previous paragraph. About 32 pounds of whole-blood was recovered in less than 3 minutes, 30 pounds of it taken in 2 minutes. Following dissection, it was noted that the thoracic cavity of the animal was extremly clean.

It is known that in conventional slaughterhouse procedures wherein bleeding is accomplished by en masse incision of the great vessels, the interior of the thoracic cavity is frequently found to be full of clots or coagulated blood and detritus. The presence of the clots or coagulated blood and detritus in the thoracic cavity results in the waste of meat insofar as human consumption is concerned.

It will be readily apparent that the process of the present invention is a major breakthrough in the slaughtering of animals by bleeding. The process greatly reduces pollution and environmental problems from slaughterhouses because of the fact that rather than the blood leaving the slaughterhouse as an organic pollutant, it is collected in a suitable container for use as a dietary nutrient. Additionally, because the blood is transferred from one sterile environment, e.g. the animal's circulatory system, to another sterile environment, e.g. the receiving container, it is not exposed to the atmosphere. Thus, the blood can be collected free of contamination by bacteria, fungi, etc. Moreover, preventing coagulation of the blood is simplified since anti-coagulants can be metered into the blood as it is being collected from the animal. Using conventional spray-drying techniques, the water can be removed from the blood leaving a powder which contains in excess of 95% protein. Lastly, since the process of the present invention permits a more complete bleeding of the animal, the amount of edible meat which is recovered from the animal is increased. The so called "hot meats" resulting from coagulation and clotting of the blood in the thoracic cavity of the animal is minimized, if not totally reduced, by the process of the present invention.

The cannula described above is merely exemplary of a cannulating device that can be used in practicing the process of the present invention. As previously noted, the cannula comprises a tubular device which provides a communication conduit from one of the great blood vessels of the animal to the exterior of the animal and desirably to a suitable collecting receiver. It is only necessary then that the cannula be of a design such that the inserted end thereof can be substantially selectively placed in the desired great blood vessel without effecting en masse incision of the surrounding great blood vessels sufficient to permit open bleeding of the animal rather than bleeding of the animal through the conduit formed by the cannula. Thus, the diameter of the portion of the cannula inserted into the blood vessel should be smaller than the diameter of the blood vessel to preclude such en masse cutting thereof. It is to be understood that in the cannulating procedure of the present invention, some incision of small blood vessels in the animal is to be expected. However, since the only opening of any consequence in the animal which would permit any significant blood loss is that formed by the cannula, virtually all blood leaving the animal will flow through the cannula into the blood collecting receiver. It should further be noted that for a given type of animal, in a given size range, constant anatomical landmarks determine the point of insertion of the cannula such that its insertion can be made with relative ease and certainty so as to ensure that the desired great blood vessel is punctured by the inserted end of the cannula. Thus, the process can be made highly efficient.

From the above description, it is apparent that numerous modifications may be made in the process of the present invention without departing from the spirit or scope thereof. Accordingly, it is intended that the invention be limited only by the appended claims.

I claim:

1. In the process of killing animals by bleeding wherein the animal is stunned prior to said bleeding, the improvement comprising:
    (a) making an incision in said animal to expose generally the midline of the anterior wall of the thorax of said animal,
    (b) inserting caudally a generally elongate, tubular member through said incision, said tubular member being inserted anteriorly of the sternum, generally midway between the forelimbs, and generally along a line between the point of insertion and the rectum of the animal, such that the inserted end thereof substantially, selectively enters a major mediastinal blood vessel of said animal without substantial en masse severing of plural major blood vessels by said insertion of said tubular member, and
    (c) collecting blood flowing through said tubular member from said blood vessel.

2. The process of claim 1 including the step of suspending said animal in the head downward position prior to making said incision.

3. The process of claim 2 wherein said animal is suspended by its hindlimbs.

4. The process of claim 1 wherein said blood vessel comprises the cranial vena cava.

5. The process of claim 1 wherein said blood vessel comprises the brachiocephalic trunk.

6. The process of claim 1 including the step of adding an anti-coagulant to blood collected from said animal.

7. The process of claim 1 wherein said animal is bovine in nature.

8. The process of claim 4 wherein said tubular member is inserted to a depth such that the inserted end thereof is craniad the right atrium of the heart of said animal.

9. The process of claim 1 wherein said tubular member is connected to a closed receiving container for said blood whereby said blood may be transferred from said animal to said container without significant contact with the atmosphere.

10. The process of claim 1 wherein said tubular member is provided with a stop to limit insertion into said animal.

11. The process of claim 1 wherein the inserted end of said tubular member is sized to have a cross-sectional area smaller than the cross-sectional area of said major mediastinal blood vessel.

* * * * *